(12) United States Patent
Braun

(10) Patent No.: US 9,151,317 B1
(45) Date of Patent: Oct. 6, 2015

(54) COWL FASTENER SYSTEM FOR SMALL AIRCRAFT

(71) Applicant: Karl Braun, Fairbanks, AK (US)

(72) Inventor: Karl Braun, Fairbanks, AK (US)

(*) Notice: Subject to any disclaimer, the term of this patent is extended or adjusted under 35 U.S.C. 154(b) by 4 days.

(21) Appl. No.: 14/259,523

(22) Filed: Apr. 23, 2014

(51) Int. Cl.
  *F16B 39/284* (2006.01)
  *F16B 39/28* (2006.01)
(52) U.S. Cl.
  CPC ..................... *F16B 39/28* (2013.01)
(58) Field of Classification Search
  CPC ............... F16B 39/28; F16B 39/284
  USPC ......................................... 411/111
  See application file for complete search history.

(56) References Cited

U.S. PATENT DOCUMENTS

| 6,860,689 | B1 * | 3/2005 | Attanasio | 411/353 |
| 7,462,008 | B2 * | 12/2008 | Attanasio | 411/353 |
| 2013/0213193 | A1 * | 8/2013 | Lukes | 411/403 |

* cited by examiner

*Primary Examiner* — Roberta Delisle
(74) *Attorney, Agent, or Firm* — Michael J. Tavella

(57) ABSTRACT

A fastening system for airplane cowls that uses a countersunk bushing that has a countersunk hole for the installation of a #10 screw that can be used with a nut plate attached to the substructure of the cowling.

7 Claims, 10 Drawing Sheets

COWL FASTENER SYSTEM FOR SMALL AIRCRAFT

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to cowl fastener systems for small aircraft and particularly to cowl fastener systems utilizing a single countersunk bushing.

2. Description of the Prior Art

Airplane fastener systems in use today use a three-part fastener that has a screw, a spring-loaded screw body and a receptacle can that is attached to the underside of a cowling or other airplane surface. FIGS. 1-7 illustrate this prior art fastening system. FIG. 1 is a perspective view of a lower retainer 100 can for a spring-loaded fastener system as prior art. This can has a lower body 101, a top flange 102 an internal wall 103 that accepts the screw body, and a threaded center hole 104 that accepts the screw.

FIG. 2 is a perspective view of a prior art spring-loaded fastener body 105 that shows a screw 106 installed in it. FIG. 3 is a detail view of a prior art fastener system, partially assembled. Here, the screw body 105 and screw 106 are positioned above the lower retainer can 100. FIG. 4 is a cross-sectional view of the spring-loaded fastener body view, as prior art. Here, the screw body 105 is shown having a spring 107 installed in it. The screw 106 is shown within the spring. FIG. 5 is a cross-sectional view of the prior art assembled fastener system as prior art. In this view, the lower retainer can 100 is shown riveted to a piece of structure 110 using rivets 111 through the top flange 102. The screw body 105 is shown seated in the internal wall 103 of the retainer can 100 with the bottom of the screw 106 engaging the threads in the threaded center hole 104.

In this design the spring is used to keep tension on the screw so that the screw body remains seated, yet, when the screw is backed off, the screw body pops up from the structure for easy removal, as shown in FIG. 5, where the screw body is above the structure. FIG. 6 is a top detail view of the prior art cowling fastener installed, as prior art. FIG. 7 is perspective detail view of the prior art cowling fastener installed, as prior art. These figures show the device as fully installed, with the screw and screw body flush with the upper surface of the structure Although this system works, is has limitation in strength because of how it is made and how it is designed to work.

BRIEF DESCRIPTION OF THE INVENTION

The instant invention overcomes these difficulties. It is a fastening system that is it designed to outlast the original equipment fasteners by a factor of greater than 50 for a fraction of the cost. The system simplifies the installation by using a countersunk bushing that has a countersunk hole for the installation of a #10 screw that can be used with a nut plate attached to the substructure of the cowling. In this way, the system eliminates the spring and ensures a stronger, longer lasting installation.

DETAILED DESCRIPTION OF THE INVENTION

Figure 1:
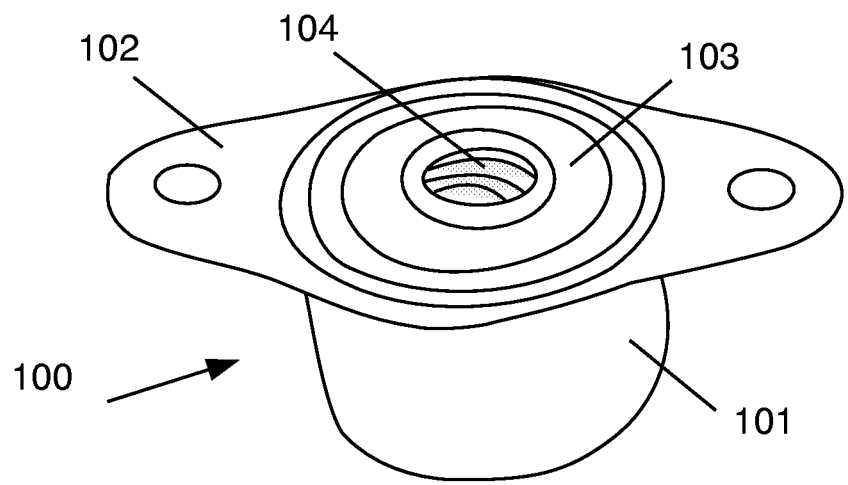
FIG. 1 is a perspective view of a lower retainer can for a spring-loaded fastener system as prior art.
Figure 2:
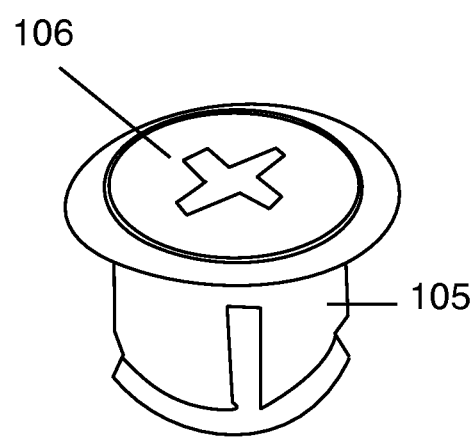
FIG. 2 is a perspective view of a spring-loaded fastener body, as prior art.
Figure 3:
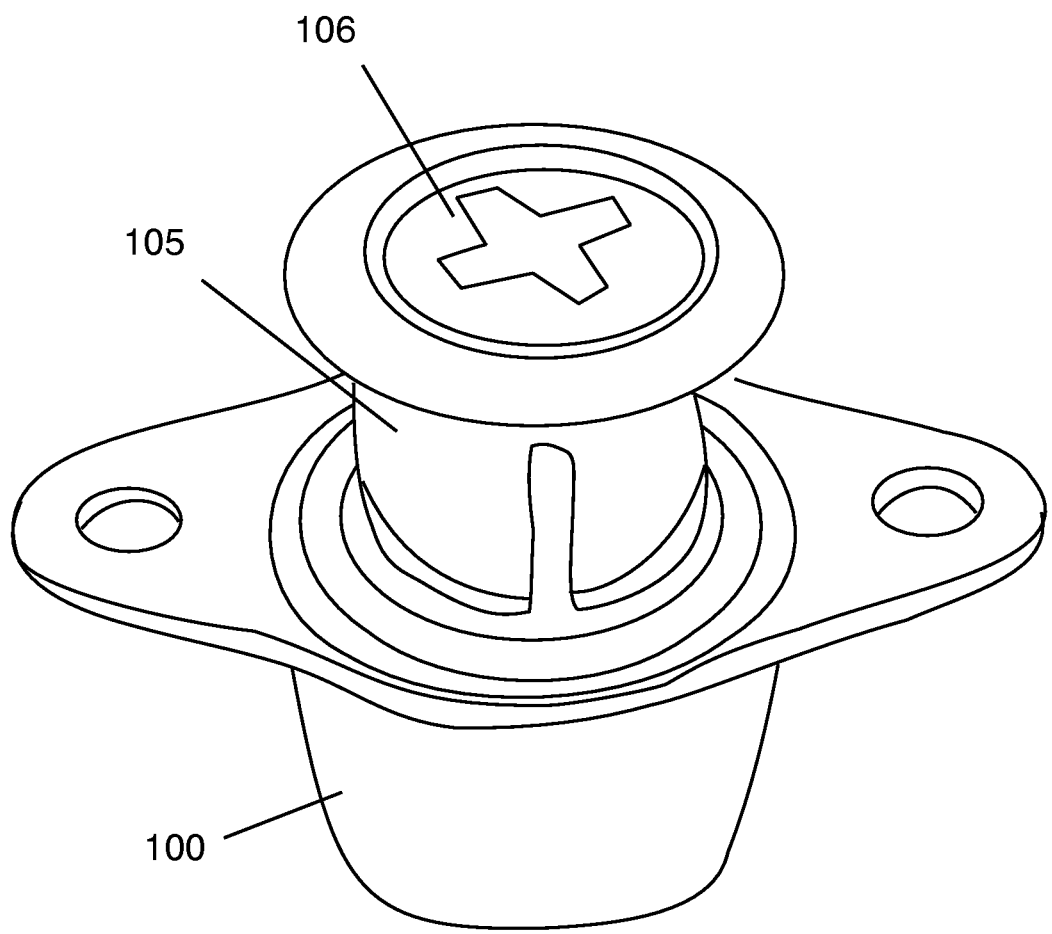
FIG. 3 is a detail view of a prior art fastener system, partially assembled, as prior art.
Figure 4:
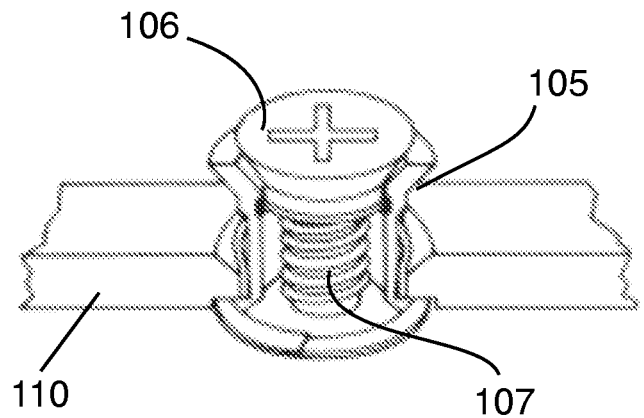
FIG. 4 is a cross-sectional view of the spring-loaded fastener body view, as prior art.
Figure 5:
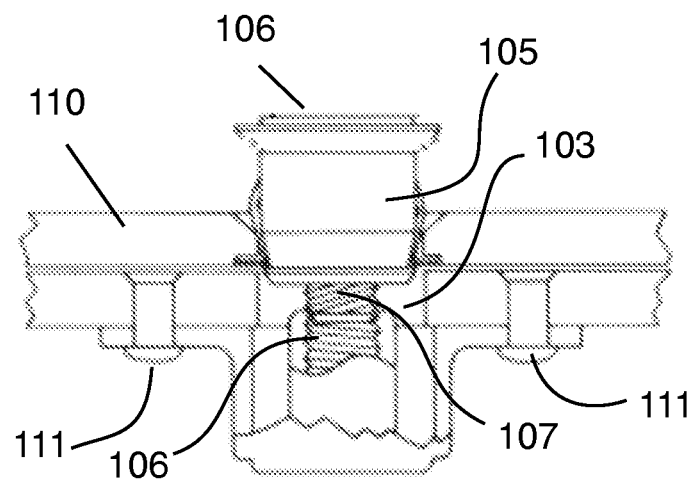
FIG. 5 is a cross-sectional view of the prior art assembled fastener system as prior art.
Figure 6:
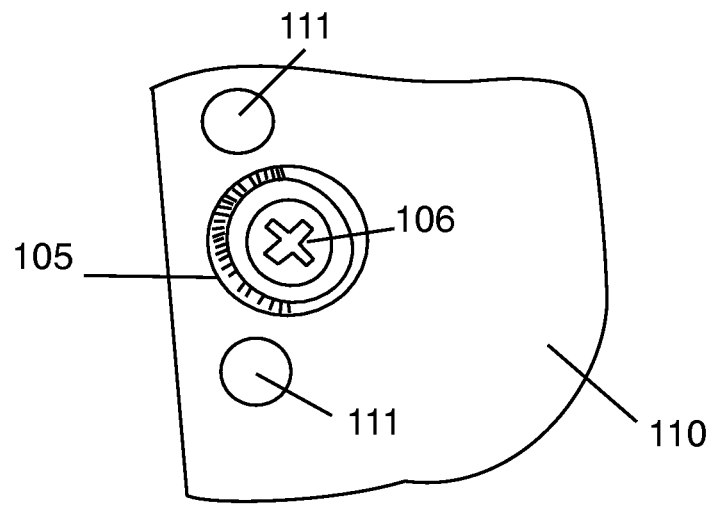
FIG. 6 is a top detail view of the prior art cowling fastener installed, as prior art.
Figure 7:
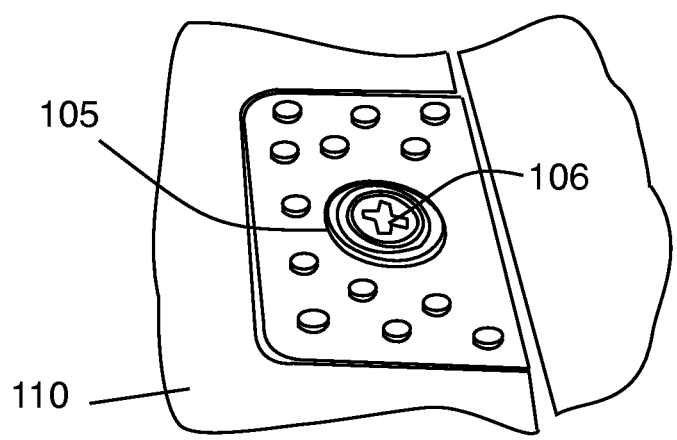
FIG. 7 is perspective detail view of the prior art cowling fastener installed, as prior art.
Figure 8:
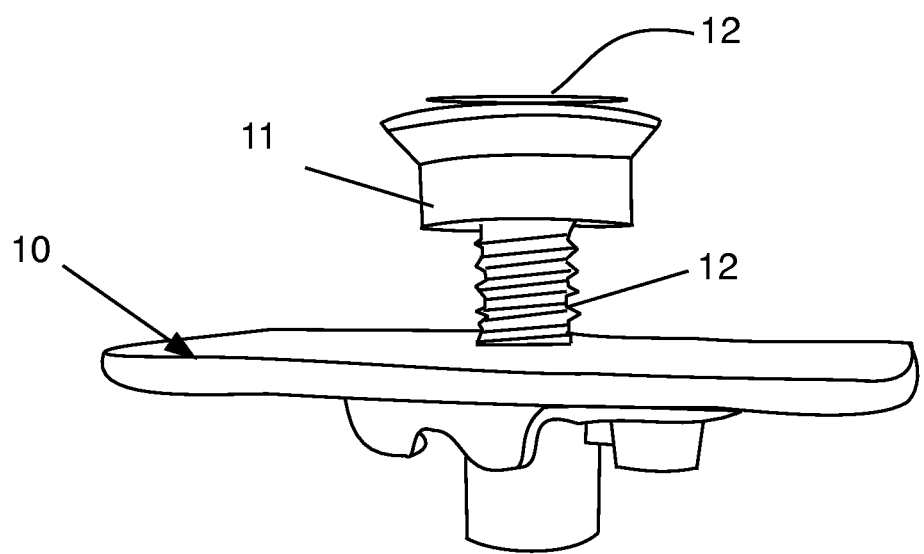
FIG. 8 is a perspective view of a screw and bushing installed in the nut plate without the cowling in place.

Referring now to FIG. 8 is a perspective view of a screw and bushing installed in the nut plate without the cowling in place. Here, the three elements of the invention are shown. The first is a nut plate 10 and the second is a tapered bushing 11. Note, as discussed below, the inside of the busing is countersunk to accommodate a screw. The final component of the invention is a screw 12. All of these components are discussed in detail below. Note that in use, the nut plate is normally attached to the inside of a cowling, and the bushing and screw are outside. The illustration here shows no cowling for clarity.

Figure 9:
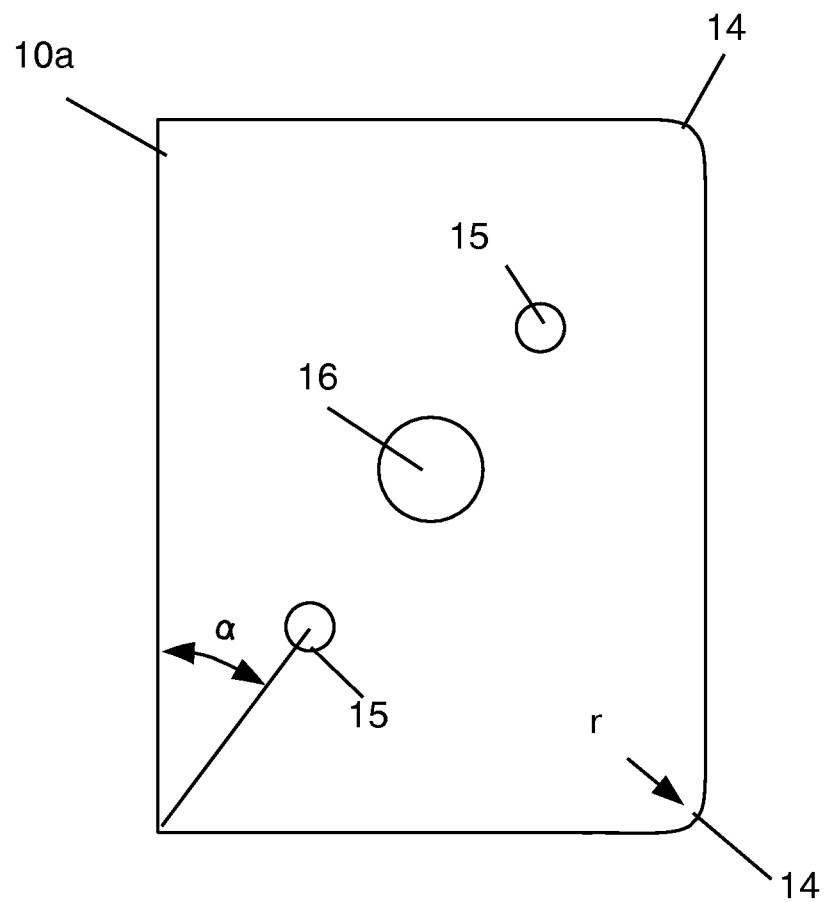
FIG. 9 is a top plan view of the nut plate used in the instant invention.

FIG. 9 is a top plan view of the nut plate 10 used in the instant invention. The top plate 10a is shown being generally flat. It is shown here with rounded front edges 14 that have a radius r. Two small holes 15 that are used to rivet the type MS21059L3 self-locking floating nutplate to the top plate are spaced along an axis having an angle α with respect to the corner as shown. In the center of the top plate 10a is a larger hole 16 that is used to receive the screw 12.

Figure 10:
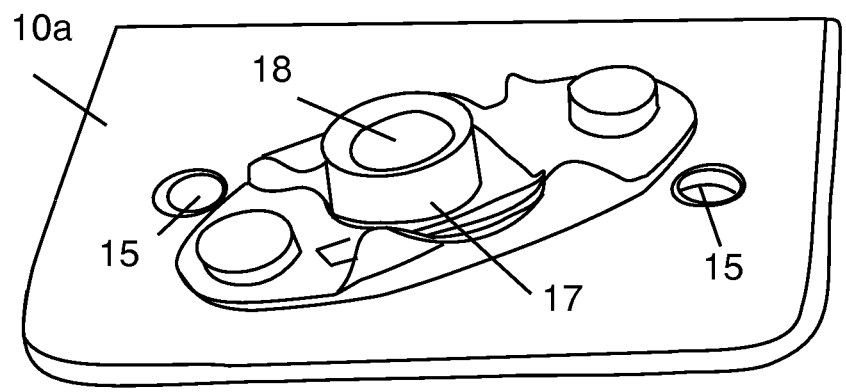
FIG. 10 is a bottom perspective view of the nut plate used in the instant invention.

FIG. 10 is a bottom perspective view of the nut plate 10 used in the instant invention. Here, the top plate 10a is shown as before. The holes 15 are visible. In the center of the top plate is the type MS21059L3 self-locking floating nutplate 17 that is formed as shown. The nutplate 17 has a center threaded receptacle 18 that extends downward from the top plate when in its normal configuration, see FIG. 8. The type MS21059L3 self-locking floating nutplate is a commercially available fitting, well known in the art.

Figure 11:
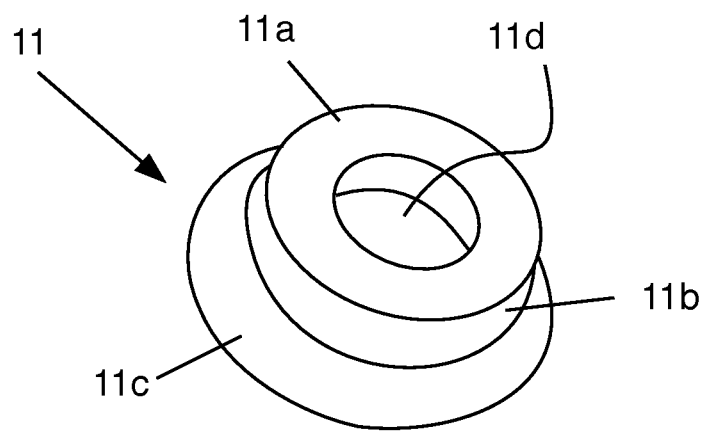
FIG. 11 is a bottom perspective view of the bushing used in the instant invention.

FIG. 11 is a bottom perspective view of the bushing used in the instant invention. Here, the bushing 11 is shown. It has a flat bottom 11a a cylindrical spacer portion 11b and a flared top 11c. It also has an open center 11d to receive the screw 12.

Figure 12:
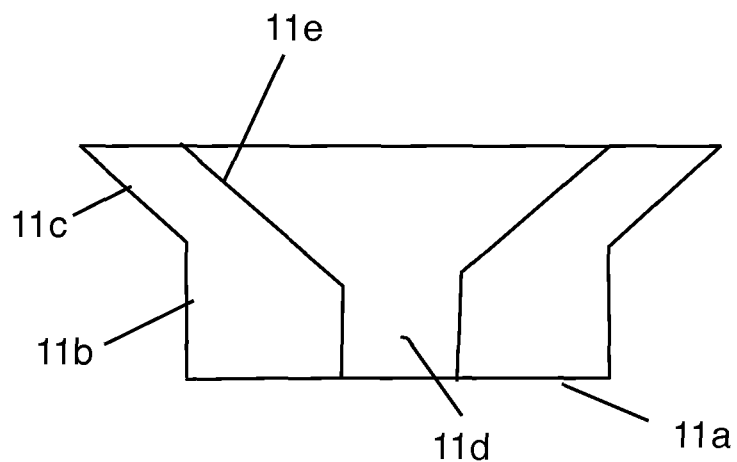
FIG. 12 is a cross-sectional view of the bushing used in the instant invention, taken along the line 12-12 of FIG. 13.
Figure 13:
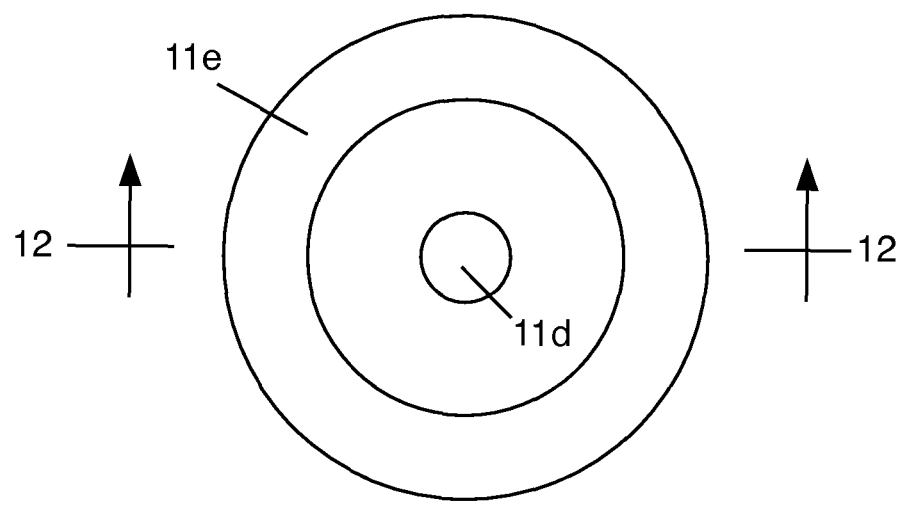
FIG. 13 is a top view of the bushing used in the instant invention.

FIG. 12 is a cross-sectional view of the bushing used in the instant invention, taken along the lines 12-12 of FIG. 13. Here, the bushing is shown with the flat bottom 11a, the cylindrical spacer portion 11b, the flared top 11c, and the open center 11d. Also shown is the countersunk portion 11e. In the preferred embodiment, the bushing is made of 17-4 PH Steel (H900/H925). Also in the preferred embodiment, the bushing has a minimum tensile strength of 160,000 psi, and therefore, a shear allowable of approximately 0.60 times that amount or 95,000 psi. The bushing is a minimum of 0.373 inch in diameter with an approximate 0.198 hole for the #10 screw. The cross sectional area is therefore, 0.0258 in and the minimum shear capability is 2,450 lb.

FIG. 13 is a top view of the bushing used in the instant invention. Here the countersunk portion 11e as well as the open center 11d are shown.

Figure 14:
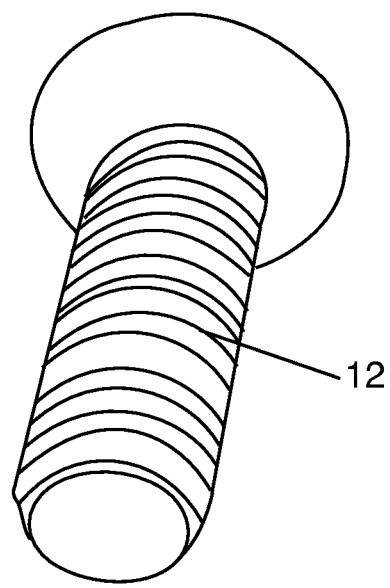
FIG. 14 is a side view of the screw.

FIG. 14 is a side view of the screw 12. In the preferred embodiment, the screw is #10 in size (0.190 inch diameter). Assuming the full diameter is capable of carrying the shear and a shear force Fsu of 75 ksi (0.60×125 ksi min per MS24694 specification) the maximum shear capability of the fastener is approximately 2,100 lb.

Figure 15:
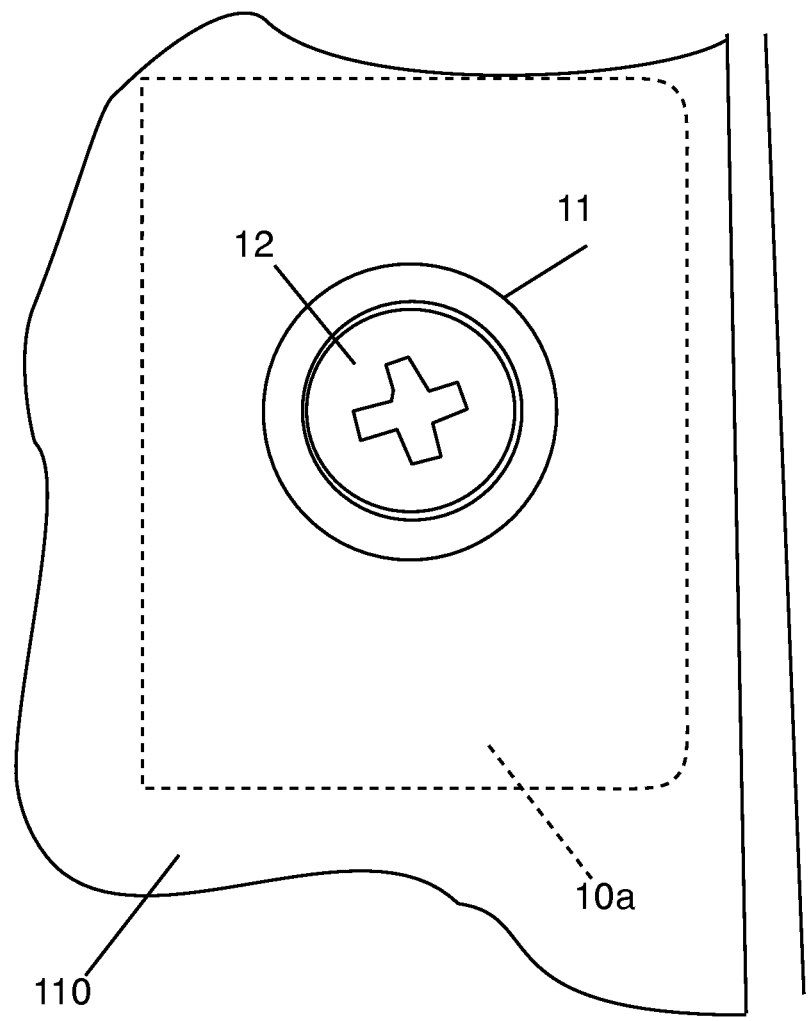
FIG. 15 is a top plan view of the invention installed in a cowling.

FIG. 15 is a top plan view of the invention installed in a cowling. Note that the nut plate 10 is shown in dashed lines under the cowling 110. The bushing 11 and screw 12 are shown above the cowling.

The fastener system is critical at the screw in shear. The actual allowable force is less than that described above due to the screw threads reducing the cross-section of the shaft at the connection.

By observation the 0.050 inch thick plate with attached MS21059L3 nut plate is deemed to be structurally to the prior art FX10-1502 receptacle. The nut plate fully engages the threads of the installed screw. The floating action of the nut plate allows the screw to bear into the top plate 10a, which is structurally more significant than the FX10-1502 receptacle of the prior art installation.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A fastening system comprising:
   a) a flat top plate having at least one hole formed therein and having a top surface and a bottom surface;
   b) a self-locking floating nutplate secured to the bottom surface of said top plate, said self-locking floating nutplate having a threaded receptacle for a screw being aligned with the at least one hole formed in said top plate and descending downwardly therefrom;
   c) a countersunk bushing, having a hole formed therein to receive a screw, said countersunk bushing being aligned with said at least one hole in said top plate and being positioned above said top surface of said top plate; and
   d) a screw inserted in said countersunk bushing such that said screw passed through said top plate and threadably engages said threaded receptacle in said self-locking floating nutplate.

2. The fastener system of claim 1 wherein the top plate and self-locking floating nutplate are positioned under a cowling having a top surface, and said countersunk bushing and screw are attached to said self-locking floating nutplate through said cowling such that when said screw is fully seated in said receptacle said countersunk bushing and said screw are substantially flush with the top surface of said cowling.

3. The fastener system of claim 1 wherein the top plate is substantially rectangular.

4. The fastener system of claim 1 wherein the screw is a #10 size screw.

5. The fastener system of claim 1 wherein the self-locking floating nutplate is a type MS21059L3.

6. The fastener system of claim 1 wherein said top plate further includes two mounting holes for said self-locking floating nutplate.

7. The fastener system of claim 6 wherein the self-locking floating nutplate is secured to said top plate with rivets.

\* \* \* \* \*